Dec. 9, 1924.  
E. L. RITTER  
1,518,357  
BRAKING MECHANISM FOR VEHICLE TRAILERS  
Filed July 12, 1923  2 Sheets-Sheet 1
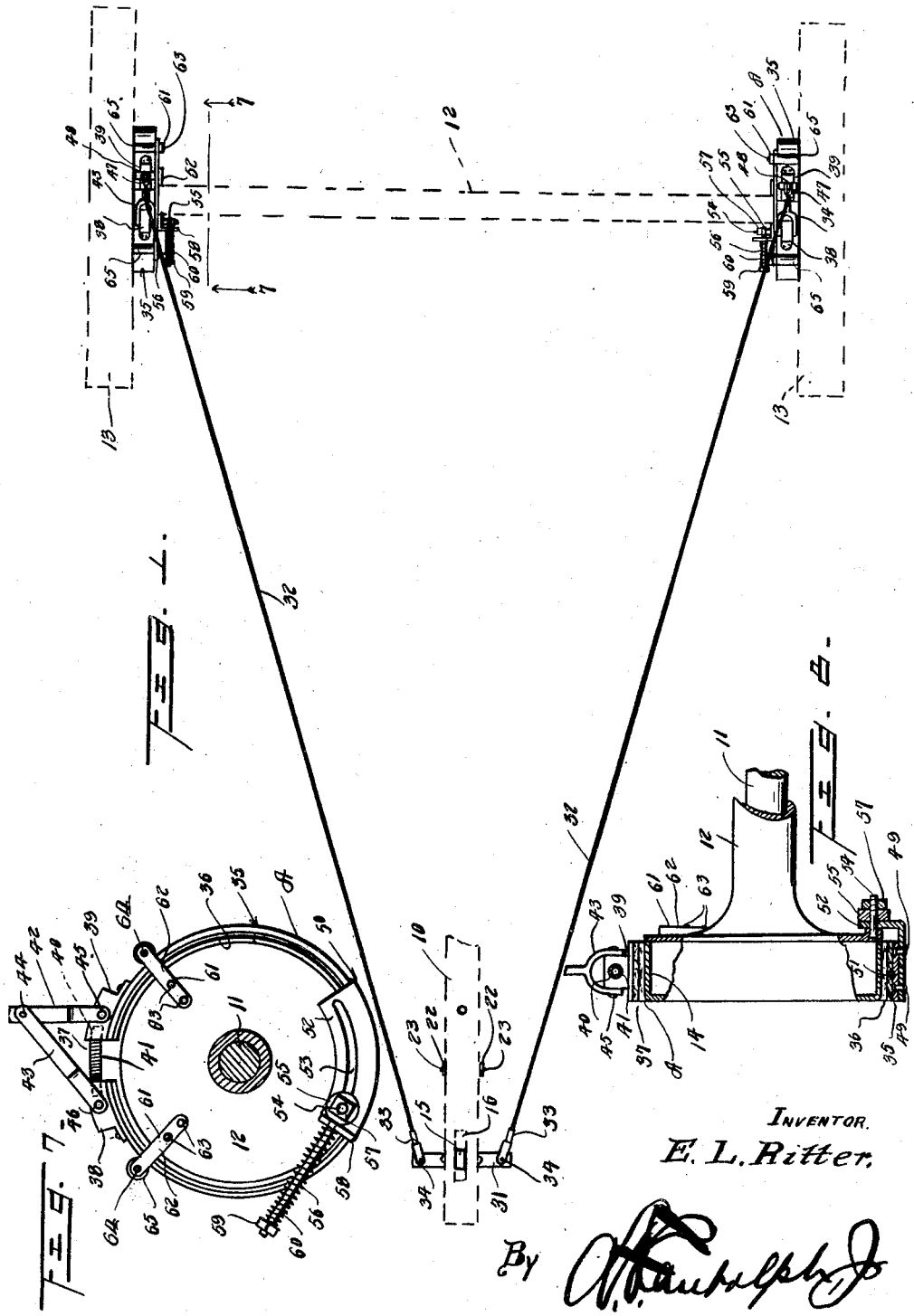
INVENTOR.  
E. L. Ritter,  
By  
ATTORNEY Dec. 9, 1924.
E. L. RITTER
1,518,357
BRAKING MECHANISM FOR VEHICLE TRAILERS
Filed July 12, 1923
2 Sheets-Sheet 2
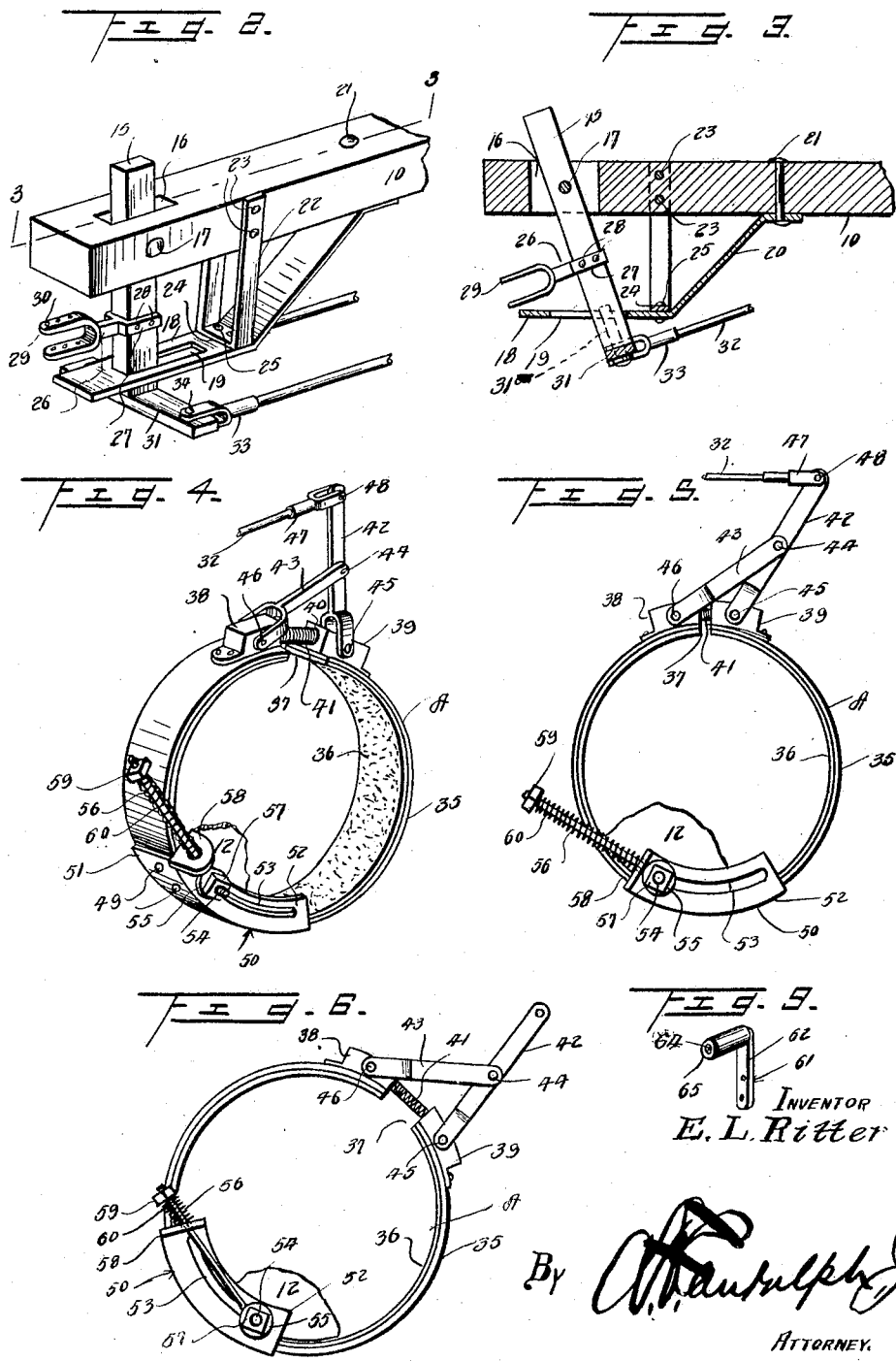

Patented Dec. 9, 1924.

1,518,357

UNITED STATES PATENT OFFICE.

ELMER L. RITTER, OF COSBY, MISSOURI.

BRAKING MECHANISM FOR VEHICLE TRAILERS.

Application filed July 12, 1923. Serial No. 651,118.

*To all whom it may concern:*

Be it known that I, ELMER L. RITTER, a citizen of the United States, residing at Cosby, in the county of Andrew and State of Missouri, have invented certain new and useful Improvements in Braking Mechanism for Vehicle Trailers; and I do hereby declare the following to be a full, clear, and exact description of the invention, such as will enable others skilled in the art to which it appertains to make and use the same.

This invention relates to a braking mechanism for vehicle trailers.

It is aimed to provide a novel, improved, durable and comparatively inexpensive means whereby the braking mechanism for a trailer will automatically operate so as to normally remain unapplied while the trailer moves with the vehicle pulling it and which brake will be applied when movement of the vehicle last referred to ceases and which brake may be released automatically so as to permit backing of the trailer.

The invention will be described in detail hereinafter and will be found illustrated in the accompanying drawings.

In said drawings:—

Figure 1 is a view illustrating the invention in top plan in connection with a trailer fragmentarily suggested by dotted lines;

Figure 2 is a detail perspective view of the control lever and associated mechanism employed;

Figure 3 is a substantially longitudinal sectional view taken on the line 3—3 of Figure 2;

Figure 4 is a detail perspective view of one of the brake bands and associated mechanism;

Figure 5 is a side elevation of the parts of Figure 4 in the applied position of the band;

Figure 6 is a view similar to Figure 5 but showing the parts in reversed position;

Figure 7 is a view taken on the line 7—7 of Figure 1 showing the brake band in released position;

Figure 8 is a side elevation, partly broken away, of the parts of Figure 7 and

Figure 9 is a detail perspective view of one of the side or positioning brackets for the band.

Like reference characters designate like or similar parts in the different views.

In reducing the invention to practice, the same is applied to a trailer of which that suggested fragmentarily in dotted lines in Figure 1 is conventional or representative. This trailer has a draft tongue 10, a rear axle 11, a housing 12 stationary on the trailer and in which axle 11 rotates, wheel 13 rigid on the axle 11 and brake drums 14 rotatable with the wheel 13.

Associated with the drums 14 are brake devices generally designated A which operate automatically and under control of a lever 15 located adjacent the forward or catching end of the trailer. This lever 15 is disposed in a slot 16 enlarged with respect thereto and provided in the draft tongue 10. A bolt or equivalent pivot 17 is carried by tongue 10 and passes through the lever 15. Below the tongue 10, a guide plate 18 is provided having an enlarged or elongated slot 19 in which the lower end of lever 15 operates. Plate 18 has an upwardly and rearwardly extending attaching portion 20 secured to the tongue 10 as by a bolt 21. In addition, a U-shaped bracket 22 has its arms fastened at 23 to the tongue 10 and depends therefrom so that its bridge 24 may be fastened at 25 to the plate 18.

An attaching bracket or clevis 26 is fastened to the lever 15 intermediate the plate 18 and tongue 10 as by means of a U-shaped portion 27 and fastening 28. The other end of the bracket 26 has a U-shaped portion 29 in a plane at a right angle to the portion 27 and adapted for connection loosely or pivotally in any desired manner, as by a fastening carried selectively through openings 30 in portion 29, to the vehicle which pulls the trailer as for instance the rear axle or the housing thereof.

At the lower end of lever 15 a transverse bar 31 is fastened which extends equidistantly on opposite sides of the lever. Rods 32 extend one from each end of bar 31 rearwardly and divergingly to the brake devices A. At the forward end, rods 32 have heads 33 which are bifurcated so as to engage opposite sides of the bar 31 and which are pivotally connected to such bar by vertical bolts or the like 34. An upstanding pivot pin 31ª (see Figure 3), connects bar 31 with lever 15 so as to equalize the push on rods 32 and the brakes which said rods control.

Referring specifically to the brake devices A, each consists of a relatively wide split or arcuate band 35 preferably of resilient metal whereby the tendency will be to move out of braking engagement with the drum 14 associated therewith and which it surrounds. If desired, the band 35 may be lined with fabric or special brake lining as at 36. The split of the band 35 occurs at 37 and to the terminals of the band adjacent the same, lugs 38 and 39 are riveted as shown or otherwise fastened. In the spacing ends, lugs 38 and 39 have sockets 40 which retain an expansive helical spring 41 which assists in separating the ends of the band 35 at the split. Toggle levers 42 and 43 are pivotally connected together by the pin 44 and at their inner ends are bifurcated and respectively pivoted as at 45 and 46 to the lugs 39 and 38 respectively. The levers 42 at their upper ends are pivotally connected to the respective rods 32 as by means of yokes 47 carried by said rods and pivoted as by pins 48 to levers 42. As a result, movement of the lever 15 so as to move the bar 31 in a direction away from the wheels, will through the medium of the rods 32, levers 42 and 43, serve to expand the bands 35 about the drums 14 whereby the brakes are released.

Riveted to each band 35 as at 49 or otherwise fastened thereto is a bracket 50, angular in cross section so as to provide an attaching flange 51 through which rivets 49 pass and a guide flange 52 which is provided with an arcuate or elongated slot 53. Bolts 54 carried by the housing 12 pass through the slots 53 and also through eyelets 55 of rods or bolts 56. Nuts 57 secure the eyelets 55 to the bolts 54. Bolts 56 slide through lugs 58 integral with the brackets 50. At the upper end, nuts 59 are threaded on the bolts 56 and are capable of varying the compression or tension of expansion helical springs 60 which bear against the same and against lugs 58 and surround bolts 56.

As shown most clearly in Figures 7 and 9, guide brackets 61 are provided to limit the expansive movement of the brake band 35. These brackets have arms 62 riveted or otherwise fastened at 63 to the drums 14 and have transverse pins or short shafts 64 on which rollers 65 are retained and journaled so as to contact with the bands 35, as shown in Figure 7, when the latter are in normal or released position.

As a result of the present construction, when the trailer moves forwardly with the vehicle propelling it and attached thereto by the bracket 26, the lever 15 is pulled and maintained in its foremost position in which, the engagement of the rods 32 with bar 31 causes the toggles 42 and 43 to expand, thus maintaining the band 35 in the released position of Figure 7 and in engagement with the rollers 65 so that they will not drag or contact with the drums 14. Thus the brakes are free or released as the trailer moves forwardly under normal conditions. Should the trailer descend a hill and tend to move faster than the pulling vehicle or should the pulling vehicle stop its motion, the forward movement of the trailer due to the connection of the bracket 26 with the propelling or pulling vehicle, will move the lever 15 automatically and rearwardly at the bar end 31 thereby through the medium of the rods 32 pushing the toggles 42 rearwardly and the toggles 43 therewith, thereby contracting and applying the bands 35 about the drums 14 and thus into braking engagement therewith. When the pulling vehicle moves forwardly, the braking engagement will be relieved as the pulling vehicle will pull on the bracket 26 and accordingly on lever 15, rods 32 and toggles 42.

In the instances referred to slight application of the brake bands 35 is sufficient to brake the forward movement of the trailer. In the event the pulling vehicle backs and the trailer is to back therewith, backing movement of the pulling vehicle will move the lever 15 rearwardly at its lower end causing the bar 31 to move rearwardly and through the medium of rods 32 and toggles 42 and 43, to apply the brake bands. Further backing movement will cause the wheels 13 by their traction with the ground to turn. Owing to the particular construction of the bands and their attachment to the housing 12, as hereinbefore described, they can rotate rearwardly with drums 14 to a limited extent permitted by movement of bolts 54 in slots 53. This movement will move the brake bands 35 into the position shown in Figure 6, compressing the springs 60 and expanding the bands 35 to the normal position of Figure 7 whereby the wheels 13 and drums 14 may thereafter turn rearwardly without interference on the part of the brake bands.

Various changes may be resorted to provided they fall within the spirit and scope of the invention.

What is claimed is:—

1. A brake mechanism for a trailer, the trailer having a tongue provided with a slot, a lever disposed in said slot and pivoted to the tongue, a guide bracket for the lever below the tongue, means on the lever for connection to a drawing vehicle, a cross bar on the lever, rearwardly diverging rods connected to the cross bar, and brake devices operable by said rods.

2. A brake mechanism for a trailer having a brake member to engage a turning part thereof, a rod having connection with a fixed part movable relatively to said brake member by said turning part, a return spring associated with said rod and tensioned by said movement, said brake member being normally expansible, and toggle means to contract said member about the turning part.

3. A brake mechanism for a trailer having a band to surround a turning part, said band being normally expansible, toggle means operable automatically through operation of a drawing vehicle to contract the band, means on the band providing an elongated slot, stationary means having a fastening element passing through said slot, a rod secured in place by said element and movable relatively to the band, and a return spring tensioned through the movement of the rod.

4. A brake mechanism for a trailer having a brake band to contract about a turnable part of the trailer upon independent movement of the trailer or a vehicle drawing the same one relatively to the other, a bracket carried by the band and provided with an elongated slot, a lug on said bracket, a rod slidable through said lug and provided with a nut on one end, an expansive spring surrounding said rod and engaging the nut thereon and said lug, and a bolt securing said rod to a fixed part of the trailer and passing through said elongated slot.

In testimony whereof I affix my signature in presence of two witnesses.

ELMER L. RITTER.

Witnesses:
 MAUDIE B. MADDOCK,
 P. E. NEWBERN.